United States Patent
Greenfeld

(10) Patent No.: US 9,263,963 B2
(45) Date of Patent: Feb. 16, 2016

(54) CURRENT-RESPONSIVE ACTIVE RECTIFICATION FOR A POWER SUPPLY OPERABLE IN A DISCONTINUOUS MODE

(71) Applicant: Intersil Americas LLC, Milpitas, CA (US)

(72) Inventor: Fred Greenfeld, Nederland, CO (US)

(73) Assignee: Intersil Americas LLC, Milpitas, CA (US)

( * ) Notice: Subject to any disclaimer, the term of this patent is extended or adjusted under 35 U.S.C. 154(b) by 422 days.

(21) Appl. No.: 13/723,738

(22) Filed: Dec. 21, 2012

(65) Prior Publication Data

US 2014/0003104 A1 Jan. 2, 2014

Related U.S. Application Data

(60) Provisional application No. 61/666,290, filed on Jun. 29, 2012.

(51) Int. Cl.
| | |
|---|---|
| *H02M 3/335* | (2006.01) |
| *H02M 7/04* | (2006.01) |
| *H02M 1/00* | (2007.01) |

(52) U.S. Cl.
CPC ............ *H02M 7/04* (2013.01); *H02M 3/33592* (2013.01); *H02M 2001/0009* (2013.01); *Y02B 70/1475* (2013.01)

(58) Field of Classification Search
CPC ................................................... H02M 3/335
USPC .............. 363/15, 16, 20, 21.01, 21.04, 21.06, 363/21.12, 21.14, 89, 127
See application file for complete search history.

(56) References Cited

U.S. PATENT DOCUMENTS

| | | | |
|---|---|---|---|
| 5,237,606 A | 8/1993 | Ziermann | |
| 7,558,082 B2 * | 7/2009 | Jitaru | ......................... 363/21.06 |
| 7,957,163 B2 | 6/2011 | Hua et al. | |
| 8,526,202 B2 * | 9/2013 | Fang et al. | ................. 363/21.14 |
| 2008/0266909 A1 * | 10/2008 | Tabaian et al. | ............. 363/21.06 |

(Continued)

OTHER PUBLICATIONS

Wally E. Rippel, "Synchronous Half-Wave Rectifier—An active circuit acts like a highly efficient diode", NASA's Jet Propulsion Laboratory, Pasadena, CA, NASA Tech Briefs (ISSN 0145-319X); 13; 7; p. 24, Jul. 1, 1989.

(Continued)

*Primary Examiner* — Jeffrey Sterrett
(74) *Attorney, Agent, or Firm* — Paul A. Bernkopf; Bryan A. Santarelli; Lane Powell PC

(57) ABSTRACT

An embodiment is an apparatus that includes an energy-storage circuit and a rectifying circuit. The energy-storage circuit is configured to generate a current that flows in a direction, and the rectifying circuit is configured to substantially block the current from flowing in a reverse direction in response to the current. Such an apparatus may be configured to block a reverse current before it begins to flow. For example, such an apparatus may include a transistor disposed in the path of the current, and may be configured to deactivate the transistor while a forward current is still flowing. Furthermore, by being configured to block the current from flowing in a reverse direction in response to the current itself, such an apparatus may better block a reverse current than an apparatus that blocks a reverse current in another manner, such as in response to a voltage across a rectifying transistor.

22 Claims, 8 Drawing Sheets

(56) References Cited

U.S. PATENT DOCUMENTS

| | | | |
|---|---|---|---|
| 2009/0109711 A1* | 4/2009 | Hsu | 363/21.14 |
| 2009/0207637 A1* | 8/2009 | Boeke | 363/21.14 |
| 2009/0262560 A1* | 10/2009 | Hua et al. | 363/21.06 |
| 2010/0027298 A1* | 2/2010 | Cohen | 363/21.14 |
| 2011/0038182 A1* | 2/2011 | Li et al. | 363/21.06 |
| 2012/0063175 A1* | 3/2012 | Wang et al. | 363/21.14 |
| 2014/0003104 A1* | 1/2014 | Greenfeld | 363/84 |
| 2014/0369086 A1* | 12/2014 | Hayasaki | 363/21.14 |

OTHER PUBLICATIONS

Archer, William R., "Current Drives Synchronous Rectifier," Design Ideas, EDN, p. 279, Nov. 28, 1985.

Philip T. Krein, and Richard M. Bass, "Autonomous Control Technique for High-Performance Switches" IEEE Transactions on Industrial Electronics, vol. 39, No. 3, Jun. 1992, 8 pages.

Archer, William R., "Current-Driven Synchronous Rectifier," Motorola TMOS Power FET Design Ideas, BR316, pp. 9-10, 1985.

TIPO Search report for Taiwan Patent Application No: 102122887; TIPO; Nov. 10, 2015; page 1.

* cited by examiner

US 9,263,963 B2

CURRENT-RESPONSIVE ACTIVE RECTIFICATION FOR A POWER SUPPLY OPERABLE IN A DISCONTINUOUS MODE

PRIORITY CLAIM

This application claims priority from provisional patent application No. 61/666,290, filed 29 Jun. 2012, which is incorporated in its entirety herein by reference.

TECHNICAL FIELD

An embodiment relates generally to power supplies, and more specifically to rectifying a current so as to block a reverse current from flowing while a power supply is operating in discontinuous mode (DCM), where the rectifying is performed in response to the current.

BACKGROUND

A discontinuous-mode (DCM) switching power supply generates a regulated output voltage in response to a current that goes to zero for a period of time during each switching cycle.

If the current reverses its direction, i.e., becomes negative or falls below zero, then the efficiency of the power supply may be significantly reduced.

Therefore, a DCM power supply may include circuitry to rectify the current; that is, such circuitry allows the current to flow in a forward direction (i.e., allows a forward current), but inhibits the current from flowing in a reverse direction (i.e., inhibits a reverse current). For example, a DCM power supply may include a transistor in the current path, and may activate the transistor while the current is flowing in the forward direction and deactivate the transistor to block the current from flowing in the reverse direction; that is, the power supply may actively rectify the current by using an active component (here a transistor) to rectify the current instead of using an inactive component such as a diode.

But unfortunately, such rectification circuitry may cause a reduction in the efficiency of a power supply that includes such rectification circuitry. For example, such rectification circuitry may not provide optimum rectification timing, and, therefore, may allow a reverse current to flow for a significant period of time before blocking the reverse current, or may block a forward current for a significant period of time when it should be conducting the forward current.

SUMMARY

An embodiment is an apparatus that includes an energy-storage circuit and a rectifying circuit. The energy-storage circuit is configured to generate a current that flows in a direction, and the rectifying circuit is configured to substantially block the current from flowing in a reverse direction in response to the current.

Such an apparatus may be configured to block a reverse current before the reverse current begins to flow. For example, such an apparatus may include a transistor disposed in the path of the current, and may be configured to deactivate the transistor while a forward current is still flowing.

Furthermore, by being configured to block the current from flowing in a reverse direction in response to the current itself, such an apparatus may better block a reverse current than an apparatus that blocks a reverse current in another manner, such as in response to a voltage across a rectifying transistor.

DETAILED DESCRIPTION

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
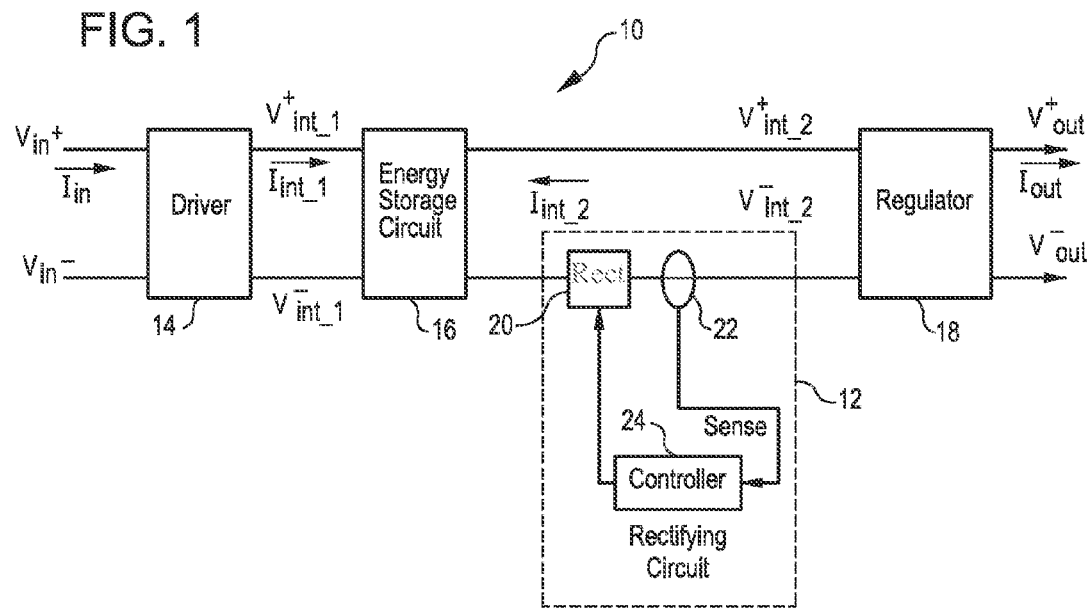
FIG. 1 is block diagram of a discontinuous-mode (DCM) power supply that is configured to actively rectify a current in response to the current according to an embodiment.

FIG. 1 is a block diagram of a discontinuous-mode (DCM) power supply 10, which is configured to generate a regulated output voltage $V_{out}$ in response to a current, and which includes a rectifier circuit 12 configured to block the current from flowing in a reverse direction in response to the current itself, according to an embodiment. For example, the rectifier circuit 12 may be configured to block the current from flowing in a reverse direction even before the current starts to flow in the reverse direction. By reducing or eliminating the period of time during which a reverse current flows, the circuit 12 may increase the efficiency of the power supply 10 as compared to the efficiency of a conventional DCM power supply.

In addition to the rectifying circuit 12, the power supply 10 includes a driver 14, an energy-storage circuit 16, and a regulator 18.

The driver 14 receives an input voltage $V_{in}$ and a current $I_{in}$, and generates first intermediate voltage $V_{int\_1}$ and first intermediate current $I_{int\_1}$.

The energy-storage circuit receives $V_{int\_1}$ and $I_{int\_1}$, and generates a second intermediate voltage $V_{int\_2}$ and a second intermediate current $I_{int\_2}$.

And the regulator 18 receives $V_{int\_2}$ and $I_{int\_2}$, and generates a regulated output voltage $V_{out}$ and a load current $I_{out}$.

The rectifying circuit 12 includes a rectifier 20, a current sensor 22, and a controller 24.

In operation, the driver 14 drives the energy-storage circuit 16, which generates a decaying, i.e., dissipating, current $I_{int\_2}$ flowing in a forward direction (i.e., through the rectifier 20) indicated by the arrow above "$I_{int\_2}$" in FIG. 1.

While the current $I_{int\_2}$ is flowing in the forward direction and has a magnitude that is above a threshold set by the controller 24, the rectifying circuit 12 allows $I_{int\_2}$ to continue to flow. In detail, the sensor 22 monitors $I_{int\_2}$ and generates a signal SENSE that represents the magnitude and the direction of $I_{int\_2}$. In response to the signal SENSE indicating that $I_{int\_2}$ is flowing in the forward direction and has a magnitude above the threshold, the controller 24 activates the rectifier 20 such that the rectifier presents a relatively small impedance to the forward flow of $I_{int\_2}$. For example, the impedance presented by the rectifier 20 may be such that a voltage drop across the rectifier is significantly less than the voltage drop (e.g., ~0.7 Volts) across a forward-biased diode; typically, the smaller the voltage drop across the rectifier, the more efficient the power supply 10.

But in response to the magnitude of the forward current $I_{int\_2}$ falling below the threshold, the rectifying circuit 12 blocks $I_{int\_2}$ from flowing, thus limiting or eliminating the time during which $I_{int\_2}$ flows in a reverse direction (i.e., opposite to the direction shown by the arrow above "$I_{int\_2}$" in FIG. 1). In detail, in response to the signal SENSE indicating that $I_{int\_2}$ is flowing in the forward direction and has a magnitude below the threshold, the controller 24 deactivates the rectifier 20 such that the blocking circuit presents a relatively high impedance to the flow of $I_{int\_2}$, the impedance being high enough to cause the magnitude of $I_{int\_2}$ to decrease to zero, and being high enough to limit or eliminate the period of time during which $I_{int\_2}$ flows in a reverse direction. Typically, the shorter the period of time during which $I_{int\_2}$ flows in a reverse direction, the more efficient the power supply 10.

The regulator 18 converts the current $I_{int\_2}$ into the voltage $V_{int\_2}$, and regulates $V_{int\_2}$ to generate $V_{out}$. For example, the regulator 18 may be any type of regulator, such as DC-DC converter (e.g., a buck converter, a buck-boost converter) or a linear regulator (e.g., a low-drop-out (LDO) regulator).

Still referring to FIG. 1, alternate embodiments of the power supply 10 are contemplated. For example, the regulator 18 may generate a regulated current $I_{out}$ instead of a regulated voltage $V_{out}$. Furthermore, the rectifier 20, the sensor 22, or both the rectifier and the sensor may be disposed in the high-side path (i.e., the path that is at voltage $V_{int\_2}$) instead of in the low-side path. Moreover, the energy-storage circuit 16 may be omitted, and the driver 14 may generate $I_{int\_2}$ directly. In addition, although described as being a DCM power supply, the power supply 10 may be another type of supply, such as a continuous-mode (CCM) power supply that sometimes operates in a discontinuous mode. For example, the power supply 10 may operate predominantly in a discontinuous mode, but may sometimes operate in a continuous mode, such as during a load transient.

Figure 2:
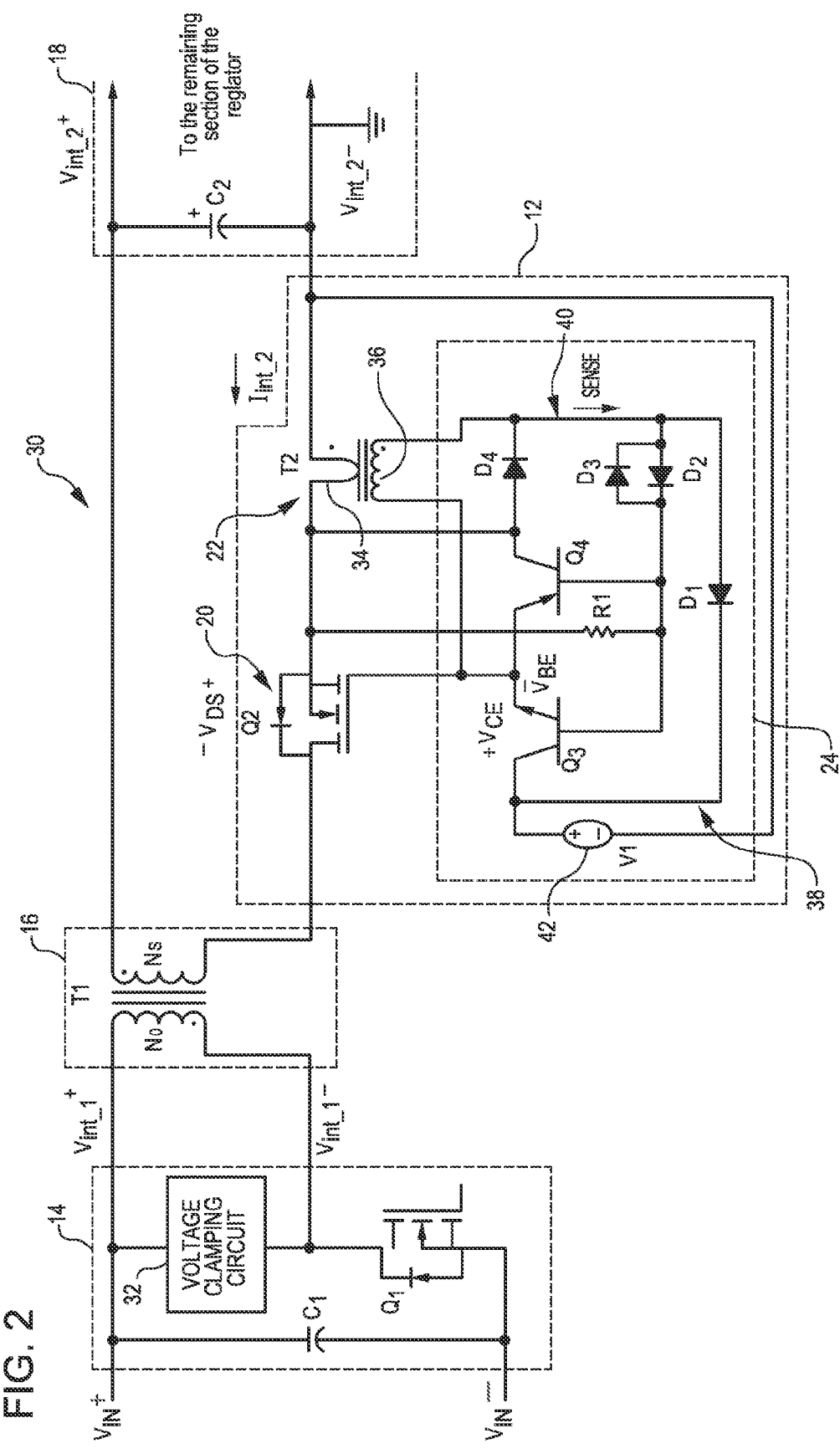
FIG. 2 is a schematic diagram of a portion of the DCM power supply of FIG. 1 according to an embodiment.

FIG. 2 is a schematic diagram of a portion 30 of the power supply 10 of FIG. 1 according to an embodiment.

The driver 14 includes an input filter capacitor C1, a switching drive NMOS transistor Q1, and a voltage-clamping circuit 32. The gate of the transistor Q1 is driven by circuitry that is omitted from FIG. 2 for clarity.

The energy-storage circuit 16 includes a transformer T1 having a primary winding Np coupled to the driver 14, and having a secondary winding Ns, which is magnetically coupled to the primary winding per the dot convention shown in FIG. 2.

The regulator 18 includes an input filter capacitor C2, and the remaining section of the regulator is omitted from FIG. 2 for brevity.

The rectifier 20 includes an NMOS transistor Q2, and the current sensor 22 includes a transformer T2 having a primary winding 34 configured to receive the current $I_{int\_2}$, and a secondary winding 36, which is magnetically coupled to the primary winding 34 per the dot convention shown in FIG. 2, and which is configured to provide the signal SENSE to the controller 24.

The controller 24 includes a circuit 38 configured to activate and deactivate the transistor Q2 in response to the current $I_{int\_2}$ flowing in a forward direction (the forward direction is indicated by the arrow over "$I_{int\_2}$" in FIG. 2), and includes a circuit 40 configured to deactivate the transistor Q2 in the event that $I_{int\_2}$ flows in a reverse direction.

The circuit 38 includes diodes D1 and D2, a bias resistor R1, a bipolar NPN transistor Q3, and a bias-voltage generator 42 configured to generate a bias voltage V1. As further described below, the value of R1 determines at what value of the forward current $I_{int\_2}$ the transistor Q2 turns off, i.e., deactivates.

And the circuit 40 includes diodes D3 and D4 and a bipolar PNP transistor Q4.

Figure 3:
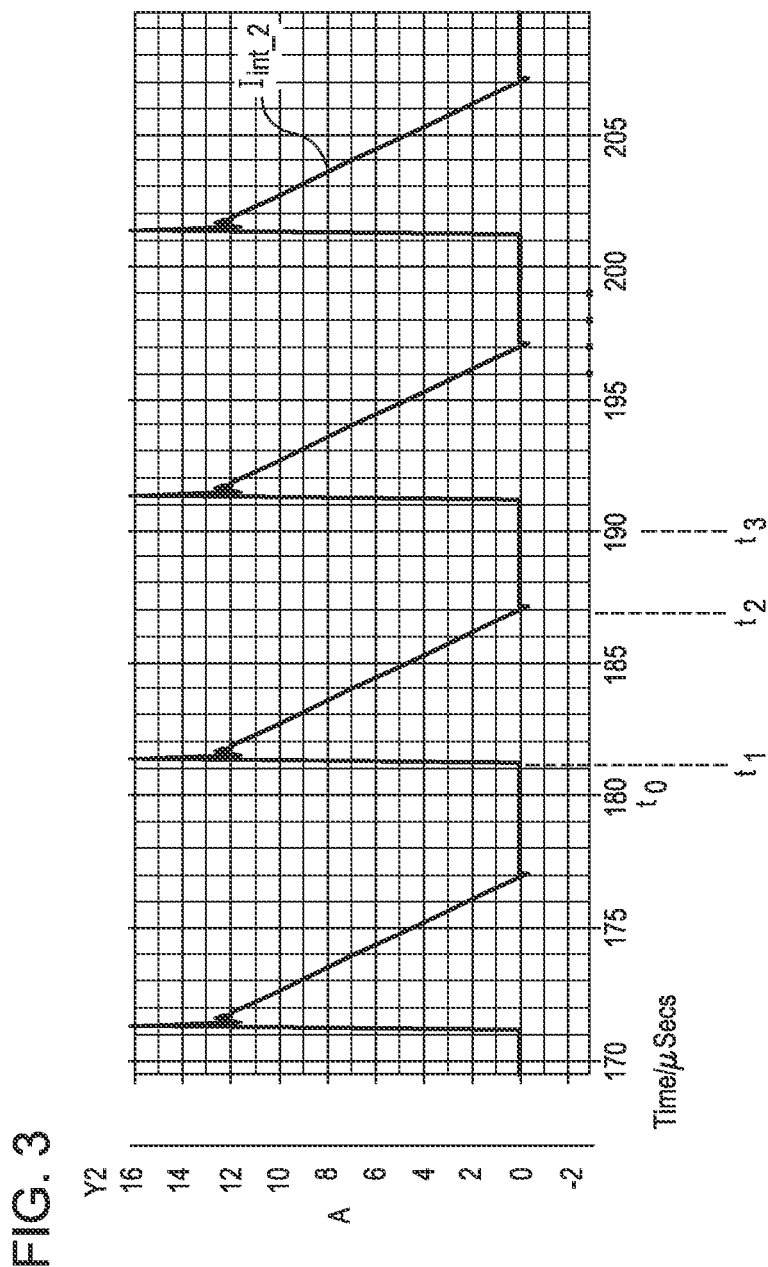
FIG. 3 is plot of the actively rectified current of FIG. 2 versus time according to an embodiment.

FIG. 3 is plot of the current $I_{int\_2}$ of the power-supply portion 30 of FIG. 2 versus time according to an embodiment.

Figure 4:
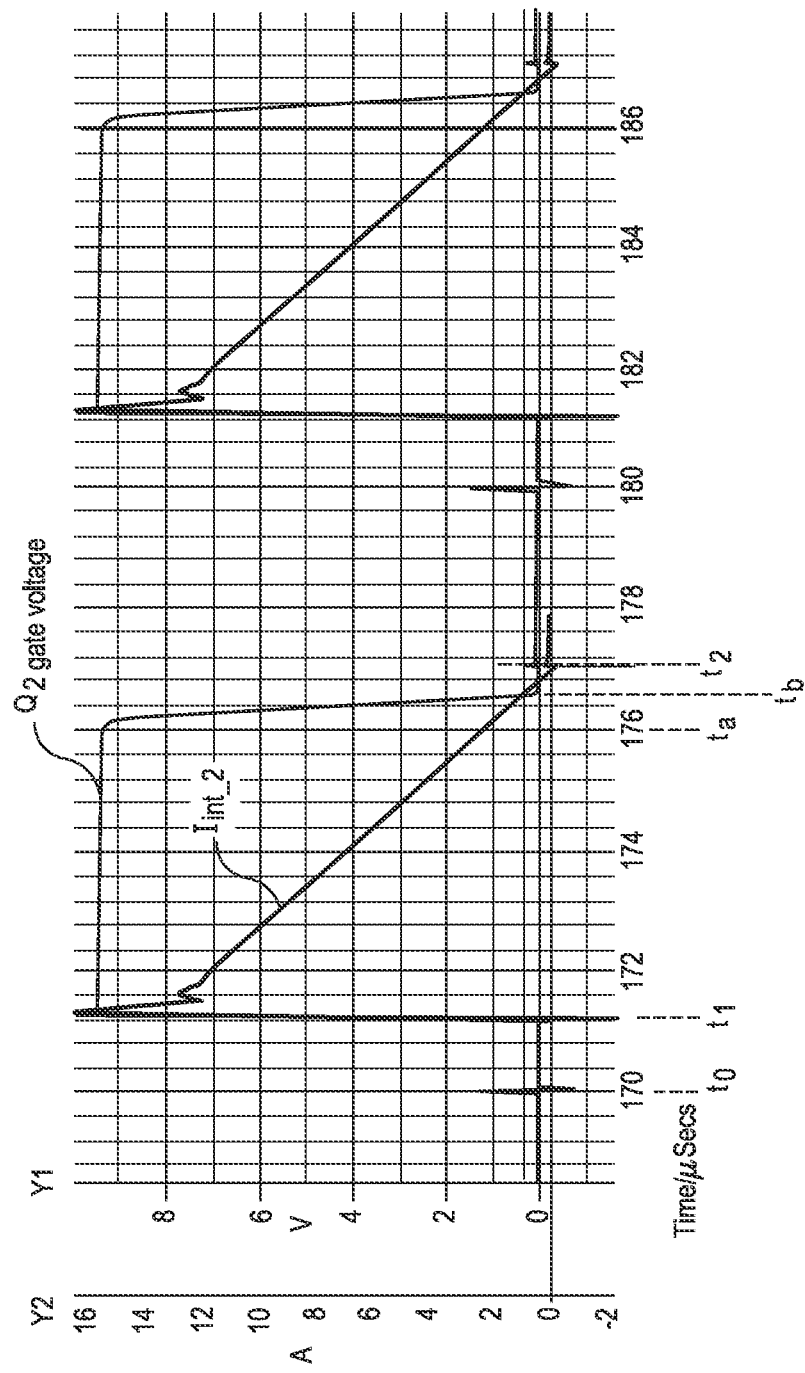
FIG. 4 is a plot of the gate voltage of the rectifying transistor of FIG. 2 versus time overlaid with a plot of the actively rectified current of FIG. 2 versus time according to an embodiment.

FIG. 4 is a plot of the gate voltage of the transistor Q2 of FIG. 2 versus time overlaid with a plot of the current $I_{int\_2}$ of FIG. 2 versus time according to an embodiment.

Figure 5:
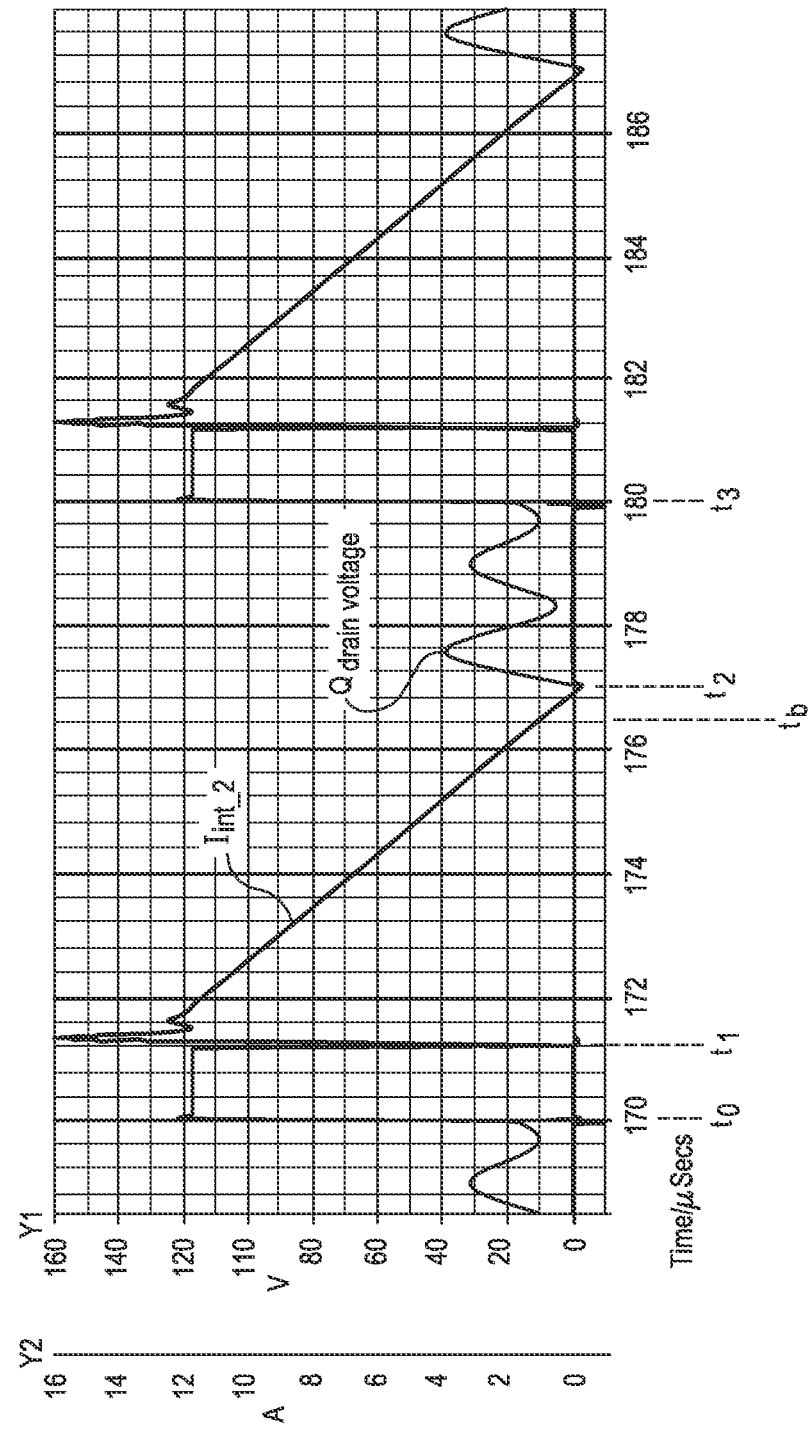
FIG. 5 is a plot of the drain voltage of the rectifying transistor of FIG. 2 versus time overlaid with a plot of the actively rectified current of FIG. 2 versus time according to an embodiment.

FIG. 5 is a plot of the drain voltage of the transistor Q2 of FIG. 2 versus time overlaid with a plot of the current $I_{int\_2}$ of FIG. 2 versus time according to an embodiment.

Figure 6:
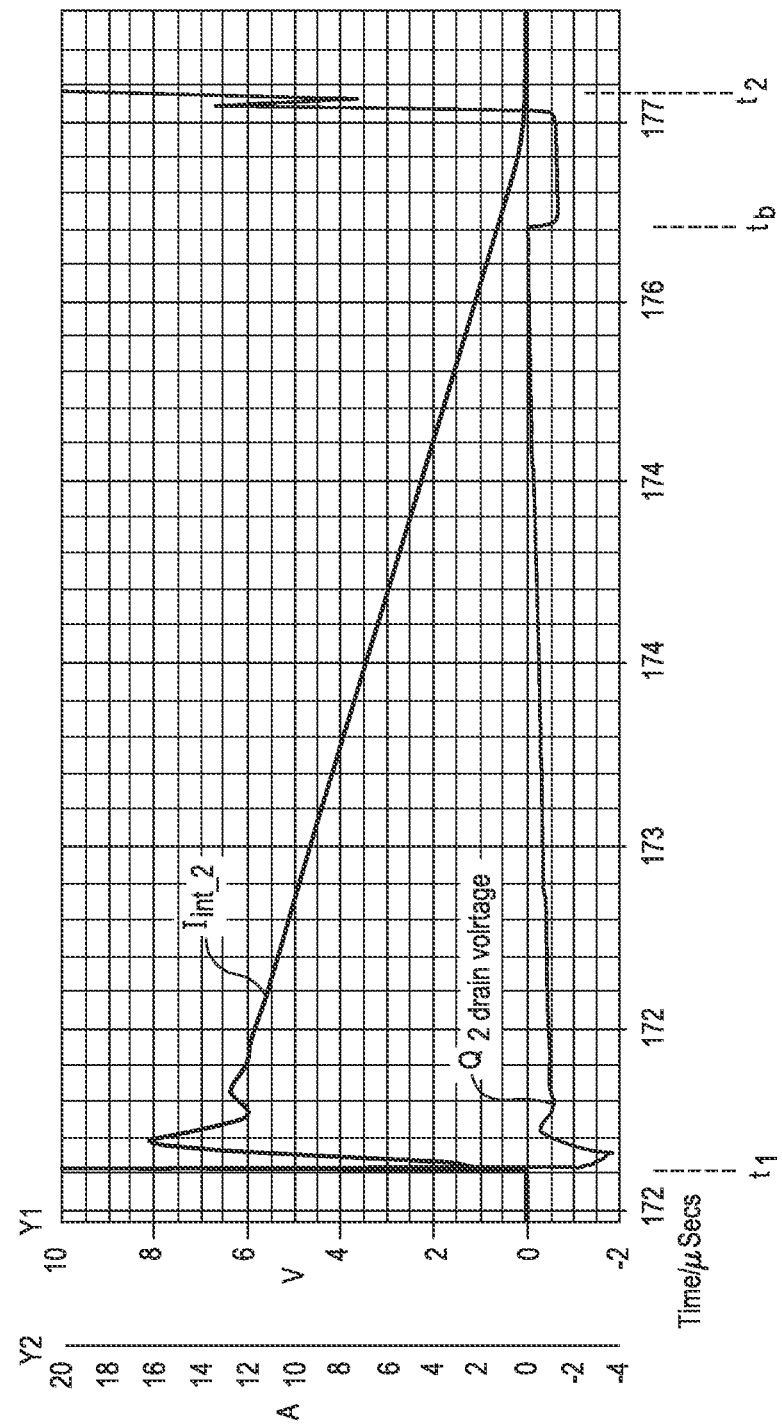
FIG. 6 is another plot of the drain voltage of the rectifying transistor of FIG. 2 versus time overlaid with a plot of the actively rectified current of FIG. 2 versus time according to an embodiment.

FIG. 6 is another plot of the drain voltage of the transistor Q2 of FIG. 2 versus time overlaid with a plot of the current $I_{int\_2}$ of FIG. 2 versus time, with a higher-resolution time scale relative to the overlaid plots of FIG. 5 according to an embodiment.

Referring to FIGS. 2-6, operation of the portion 30 of the power supply 10 of FIG. 1 is described according to an embodiment.

During a charging portion of the transistor Q1 switching cycle (FIG. 3) between times $t_0$ and $t_1$, Q1 is activated such that it draws a current through the primary winding Np of the transformer T1. This forces the dotted nodes of the primary and secondary windings Np and Ns to low voltage levels relative to the respective undotted winding nodes. Normally, this would cause the secondary winding Ns to source a reverse current $I_{int\_2}$; but because the transistor Q2 is deactivated, and its body diode is reverse biased, the secondary winding does not generate a current. Therefore, the energy generated by the current flowing through the primary winding Np is stored in the transformer's magnetic field.

At time $t_1$, the transistor Q1 is deactivated such that it stops drawing a current through the primary winding Np of the transformer T1.

During a discharging portion of the transistor Q1 switching cycle (FIG. 3) between times $t_1$ and $t_2$, the voltage clamping circuit 32 provides a path for the leakage inductance (not shown in FIG. 2) of the transformer T1, referred to the primary winding Np, to discharge by sourcing a primary-side discharge current that flows clockwise through the primary winding and the clamping circuit; furthermore, the voltage clamping circuit limits the voltage across the primary winding to a predetermined value (e.g., 20 Volts) to protect Q1 from excessive voltage-induced stress.

Further during the discharging portion of the transistor Q1 switching cycle (FIG. 3) between the times $t_1$ and $t_2$, the energy stored in the magnetic field of the transformer T1 during the charging portion of the Q1 switching cycle dissipates by causing a forward current $I_{int\_2}$ to flow through the secondary winding Ns (i.e., in the direction shown by the arrow over "$I_{int\_2}$" in FIG. 2), where $I_{int\_2}$ dissipates approximately linearly from an initial, maximum value at time $t_1$ to zero at time $t_2$.

As $I_{int\_2}$ begins to flow at time $t_1$, the transistor Q2 is initially inactive; therefore, $I_{int\_2}$ initially flows through the primary winding 34 of the transformer T2 and the forward-biased body diode of Q2.

This initial flow of $I_{int\_2}$ through the primary winding 34 of the transformer T2 forces the dotted nodes of the primary winding and the secondary winding 36 to high voltage levels relative to the respective undotted nodes, and the voltage across the secondary winding causes a current SENSE to flow through the secondary winding in the direction shown by the arrow. In more detail, the voltage across the secondary winding 36 causes the voltage $V_{CE}$ across the collector-emitter junction of the transistor Q3 to drop to the voltage $V_{BE}$ across the base-emitter junction of Q3 such that Q3 begins to conduct (the limiting of $V_{CE}$ to $V_{BE}$ is described below), and the current SENSE begins to flow after Q3 begins to conduct.

The current SENSE flows to the diode D2, and a first portion of this current flows through the diode D1, a second portion of this current flows through the diode D2 into the base of the transistor Q3, thus activating Q3, and a third portion flows through the resistor R1. The diode D1 has at least two effects. The first effect is that the diode D1 serves to conduct away an excess amount of the current SENSE so as to maintain the base current of the transistor Q3 at a level that is low enough to prevent damage to Q3. The second effect, which can be shown by application of Kirchoff's voltage law around the two circuit loops that include the secondary winding 36 of the transformer T2, is that the diode D1 limits the minimum value of the voltage $V_{CE}$ across the collector-emitter junction of the transistor Q3 to approximately the voltage $V_{BE}$ across the base-emitter junction of Q3; this limiting of the minimum value of $V_{CE}$ may keep Q3 out of saturation, and thus may allow Q3 to deactivate faster than if it were to saturate.

Consequently, the transistor Q3 couples an activation voltage equal to approximately $V1-V_{CE}=V1-V_{BE}$ to the gate of the transistor Q2, thus activating Q2. Per FIG. 4, the transistor Q3 applies this activation voltage to the gate of the transistor Q2 relatively quickly after $I_{int\_2}$ begins to flow at time $t_1$. Furthermore, the voltage at the node of the resistor R1 that is coupled to the base of the transistor Q3 is at approximately the voltage V1, and, therefore, the current though R1 is approximately V1/R1 (assuming that the voltage drop across the primary winding 34 of the transformer T2 is relatively small).

After the transistor Q2 turns on (i.e., activates), the current $I_{int\_2}$ stops flowing through the body diode of Q2, and instead flows from the drain to the source of Q2. Therefore, the voltage across the transistor Q2 drops from a forward-biased-P-N-junction voltage to a significantly smaller voltage equal to the product of $I_{int\_2}$ and $R_{ds\_on}$, which is the resistance between the drain and the source of Q2 while Q2 is active. Because the power dissipated in the transistor Q2 is equal to the product of $I_{int\_2}$ and the drain-source voltage $V_{DS}$ across Q2, by activating Q2 relatively quickly, the controller 24 limits the power loss in Q2 by limiting the time that $I_{int\_2}$ flows through Q2's body diode.

At a time $t_0$ (FIG. 4), the decrease in the forward current $I_{int\_2}$ is enough to decreases the current SENSE to a point where SENSE cannot maintain the voltage at the base of the transistor Q3 at approximately V1 due to the current being sunk through the resistor R1; therefore, the voltage at the gate of the transistor Q2 also begins to decrease. As the current SENSE continues to decrease, the voltage at the gate of the transistor Q2 also continues to decrease. And during this period of decreasing gate voltage, the transistor Q2 operates in its triode region, and thus operates as voltage-controlled resistor. Therefore, as the gate voltage of Q2 decreases, $R_{ds\_on}$ of Q2 increases.

At a time $t_b$, the voltage at the gate of the transistor Q2 decreases to a level that causes Q2 to deactivate.

If there is still a forward current $I_{int\_1}$ flowing after Q2 deactivates, then, after $R_{ds\_on}$ of Q2 decreases to a point where the drain-source voltage $V_{ds}$ of Q2 exceeds the activation voltage of Q2's body diode, $I_{int\_1}$ begins to flow through Q2's body diode as described below in conjunction with FIG. 6.

Referring to FIG. 6, during the period from the time $t_b$ to the time $t_2$, a "last gasp" of the current $I_{int\_2}$ flows through the body diode of the transistor Q2; but the period between $t_b$ and $t_2$ may be short enough, and the product of $I_{int\_2}$ and the forward voltage of the body diode (i.e., the power dissipated by Q2) during this period small enough, so as to negligibly increase the total power dissipated by Q2 during the Q1 switching cycle. The time from $t_b$ to $t_2$ may act as a buffer period that allows Q2 to fully deactivate before $I_{int\_2}$ begins to flow in a reverse direction.

Furthermore, FIG. 6 also shows that the drain voltage of the transistor Q2 increases linearly as $I_{int\_2}$ decreases; this is due to the drain voltage increasing toward ground as $I_{int\_2}$ decreases.

Referring to FIG. 3, the period between the times $t_2$ and $t_3$ is the discontinuous portion of the transistor Q1 switching cycle, during which Q1 is still inactive and $I_{int\_2}$ is not flowing, i.e., is equal to zero. Referring to FIG. 5, although parasitic currents may flow between the drain and source of the transistor Q2 and in the primary winding 34 of T2 as evidenced by the oscillation of the voltage at the drain of Q2 during the discontinuous period, these currents are too small to turn on Q2; therefore, these currents do not cause $I_{int\_2}$ to flow in a reverse direction, and to discharge C2, during the discontinuous period.

Referring to FIGS. 2-6, the power-supply portion 30 repeats the above-described operation for each subsequent switching cycle of the transistor Q1.

Still referring to FIGS. 2-6, if $I_{int\_2}$ does reverse its direction before the transistor Q2 deactivates, then the transistor Q4 deactivates Q2. If a reverse current $I_{int\_2}$ begins to flow, this causes a reverse current to flow through the secondary winding 36 of the transformer T2, the emitter-collector junction of the transistor Q4, and the diode D4, and also causes a base current to flow from the base of Q4 through the diode D3. Therefore, the current sunk by the emitter of the transistor Q4 discharges the gate of the transistor Q2, and thus deactivates Q2, relatively quickly, thus limiting the amount of time during which $I_{int\_2}$ can flow in a reverse direction. A reason that the current $I_{int\_2}$ may flow in a reverse direction is if one sets the value of the resistor R1 so as to reduce the time period between $t_b$ and $t_2$, during which $I_{int\_2}$ flows through the body diode of the transistor Q2, to approximately zero; if R1 is too big due, for example, to a tolerance issue, then Q2 may not completely deactivate before $I_{int\_2}$ reverses its direction.

Referring to FIG. 2, alternate embodiments of the power-supply portion 30 are contemplated. For example, the diode D4 may be omitted, and one or more of the diodes D1-D3 may be replaced with other voltage-dropping components such as a Zener diode or a resistor. Furthermore, the circuit 40 may be omitted. Moreover, the transformer T2 may be replaced with another current-sensing component such as a Hall-effect device or an optical coupler. In addition, the transformer T1 may be replaced with an inductor circuit. Furthermore, although the power-supply portion 30 is disclosed as being a portion of a flyback power supply, an embodiment of the rectifying circuit 12, or of any other circuit that implements one or more of the rectifying principles described above, may be used with any other type of power supply that is configured to operate in a discontinuous mode.

Figure 7:
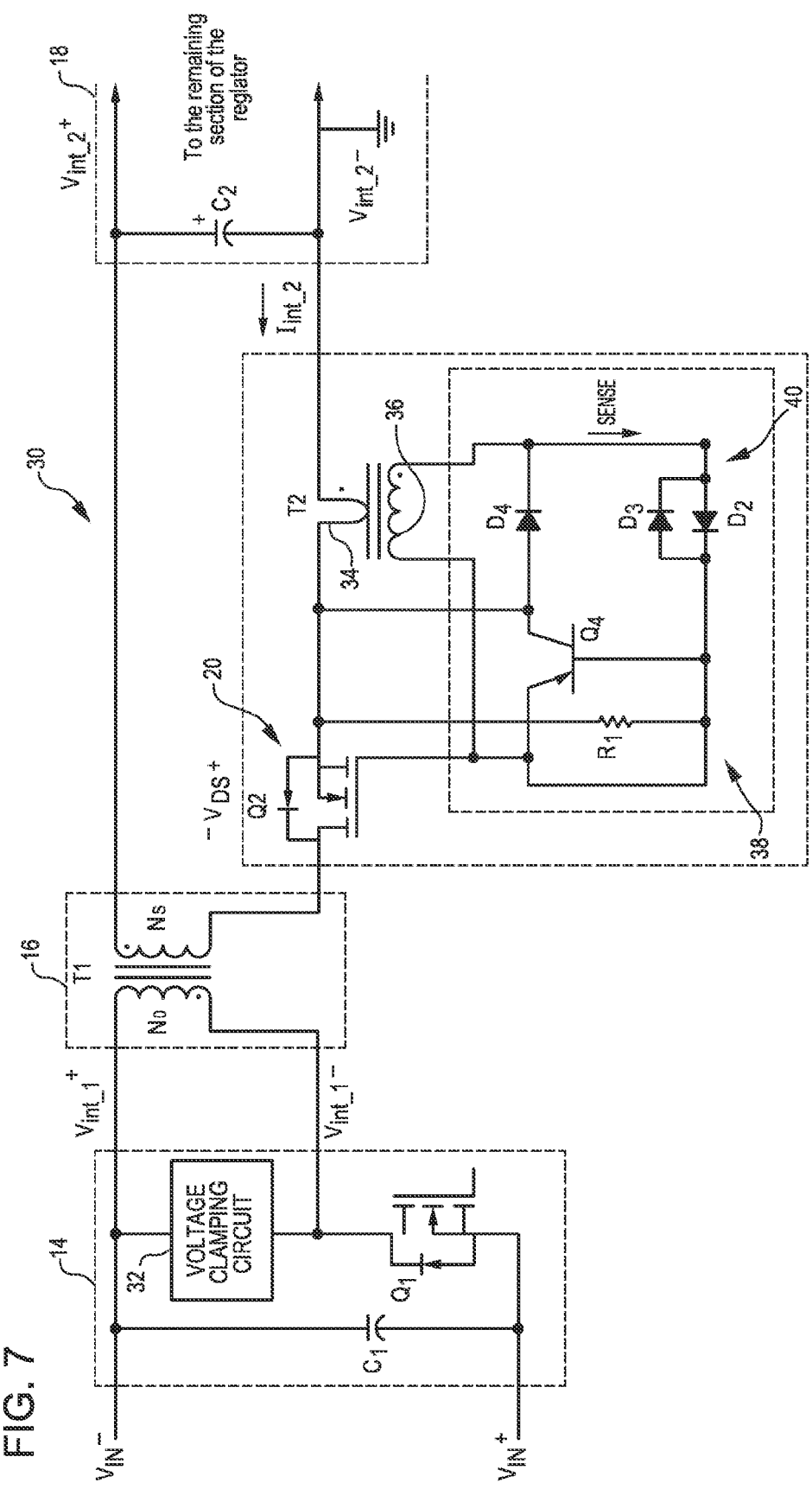
FIG. 7 is a schematic diagram of a portion of the DCM power supply of FIG. 1 according to another embodiment.

FIG. 7 is a schematic diagram of a portion 50 of the power supply 10 of FIG. 1 according to an embodiment. The portion 50 is similar to the portion 30 of FIG. 2 except that the transistor Q3, the diode D1, and the voltage generator 42 are omitted from the circuit 38. In operation, while the current $I_{int\_2}$ is flowing in a forward direction, the current SENSE from the secondary winding 36 of the transformer T2 flows through the resistor R1, and, therefore, generates, at the gate of the transistor Q2, a voltage that is approximately equal to the product of R1 and SENSE. Therefore, in a manner similar to that described above in conjunction with FIG. 2, one can select the value of the resistor R1 to set the magnitude of $I_{int\_2}$ at which the transistor Q2 deactivates, and thus can set the time $t_b$ at which Q2 becomes inactive.

Still referring to FIG. 7, alternate embodiments of the power-supply portion 50 are contemplated. For example, the one or more of the diodes D2-D4 may be omitted, or may be replaced with another component such as a resistor or a Zener diode. Furthermore, the circuit 40 (i.e., the transistor Q4, and the diodes D3 and D4) may be omitted.

Figure 8:
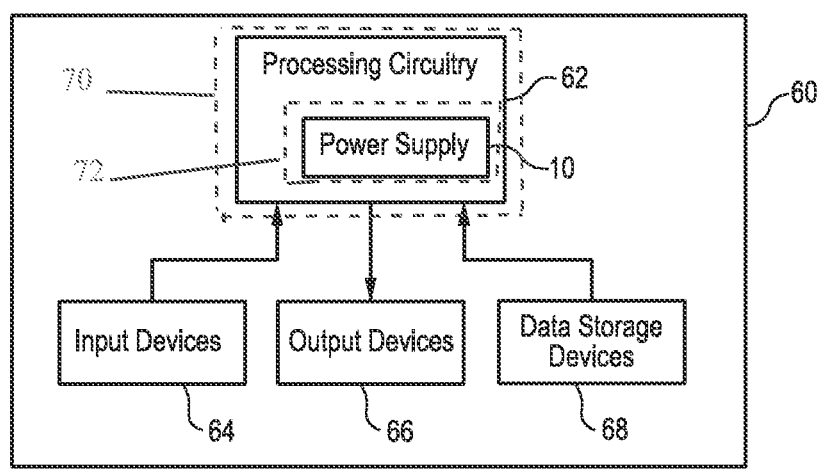
FIG. 8 is a block diagram of a system that incorporates the power supply of FIG. 1 according to an embodiment.

FIG. 8 is a functional block diagram of an electronic system 60, which includes processing circuitry 62 containing one or more of the embodiments of the power supply 10 of FIG. 1. The processing circuitry 62 includes circuitry for performing various functions, such as executing specific software to perform specific calculations or controlling the system 60 to provide desired functionality. In addition, the electronic system 60 includes one or more input devices 64, such as a keyboard, mouse, touch screen, audible or voice-recognition component, and so on, coupled to the processing circuitry 62 to allow an operator to interface with the electronic system. Typically, the electronic system 60 also includes one or more output devices 66 coupled to the processing circuitry 62, where the output devices can include a printer, video display, audio output components, and so on. One or more data-storage devices 68 are also typically coupled to the processing circuitry 62 to store data or retrieve data from storage media (not shown). Examples of typical data storage devices 68 include magnetic disks, FLASH memory, other types of solid state memory, tape drives, optical disks like compact disks and digital video disks (DVDs), and so on.

Still referring to FIG. 8, in an embodiment, at least a portion of the processing circuitry 62 and at least a portion of the power supply 10 are disposed on respective integrated-circuit dies 70 and 72.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

What is claimed is:

1. An apparatus, comprising:
   an energy-storage circuit configured to generate a current that flows in a direction; and
   a rectifying circuit configured to block the current from flowing in a reverse direction in response to the current before the current equals zero.

2. The apparatus of claim 1 wherein the energy-storage circuit includes a winding of a transformer.

3. The apparatus of claim 1 wherein the energy-storage circuit is configured to generate as the current a dissipating current.

4. The apparatus of claim 1 wherein the energy-storage circuit is configured to generate as the current a current that dissipates linearly.

5. The apparatus of claim 1 wherein the rectifying circuit is configured to block the current from flowing in the reverse direction before the current begins to flow in the reverse direction.

6. The apparatus of claim 1, wherein the rectifying circuit includes:
   a rectifier disposed in a path of the current and having an impedance;
   a sensor configured to generate a sense signal in response to the current; and
   a controller configured to change the impedance of the rectifier in response to the sense signal.

7. The apparatus of claim 1, wherein the rectifying circuit includes:
   a transistor disposed in a path of the current and having a conductance;
   a transformer having a first winding disposed in the path of the current and having a second winding configured to generate a sense signal in response to the current flowing through the first winding; and
   a control circuit configured to change the conductance of the transistor in response to the sense signal.

8. The apparatus of claim 1, wherein the rectifying circuit includes:
   a transistor disposed in a path of the current and having a conductance;
   a transformer having a first winding disposed in the path of the current and having a second winding configured to generate a sense signal in response to the current flowing through the first winding; and
   a control circuit configured to decrease the conductance of the transistor in response to the sense signal indicating that a magnitude of the current flowing through the first winding of the transformer is less than a threshold.

9. The apparatus of claim 1, further comprising a regulator configured to generate a regulated voltage in response to the current.

10. The apparatus of claim 1, further comprising a drive circuit configured to drive the energy-storage circuit.

11. The apparatus of claim 1, further comprising:
    a drive circuit configured to generate a drive current; and
    wherein the energy-storage circuit includes a transformer having a first winding configured to receive the drive current and having a second winding configured to generate the current in response to energy stored by the transformer in response to the drive current flowing through the first winding.

12. The apparatus of claim 1 wherein the rectifying circuit is configured to block the current from flowing in the reverse direction in response to the current equaling zero.

13. The apparatus of claim 1 wherein the rectifying circuit is configured to block the current from flowing in the reverse direction in response to the current equaling, or being less than, zero.

14. A system, comprising:
    an integrated circuit; and
    a power supply coupled to the integrated circuit, the power supply including
       an energy-storage circuit configured to generate a current that flows in a direction, an rectifying circuit configured to block the current from flowing in a reverse direction in response to the current before the current stops flowing in the direction, and a regulator configured to generate a supply voltage in response to the current and to provide the supply voltage to the integrated circuit.

15. The system of claim 14 wherein the integrated circuit includes a control unit.

16. The system of claim 14 wherein at least a portion of the integrated circuit and at least a portion of the power supply are disposed on a same integrated-circuit die.

17. The system of claim 14 wherein at least a portion of the integrated circuit and at least a portion of the power supply are disposed on respective integrated-circuit dies.

18. A method, comprising:
generating a current that flows in a direction; and
actively rectifying the current in response to the current before the current stops flowing in the direction.

19. The method of claim 18 wherein actively rectifying the current includes turning on a switch circuit through which the current flows.

20. The method of claim 18, further comprising generating a regulated voltage in response to the actively rectified current.

21. The method of claim 18 wherein generating the current includes generating a dissipating current.

22. The method of claim 18 wherein actively rectifying the current includes blocking the current from flowing in a reverse direction.

* * * * *